United States Patent [19]
Antonenko et al.

[11] Patent Number: 6,117,397
[45] Date of Patent: Sep. 12, 2000

[54] SYSTEM AND METHODS FOR PARALLEL SYNTHESIS OF ORGANIC COMPOUNDS

[75] Inventors: Valery V. Antonenko, Cupertino; Nicolay V. Kulikov, Santa Cruz; Jeffrey W. Jacobs, San Mateo, all of Calif.

[73] Assignee: Glaxo Group Limited, Greenford, United Kingdom

[21] Appl. No.: 08/920,965

[22] Filed: Aug. 29, 1997

Related U.S. Application Data

[62] Division of application No. 08/736,317, Oct. 23, 1996, Pat. No. 6,042,789.

[51] Int. Cl.$^7$ ........................................................ B01L 1/00
[52] U.S. Cl. .......................... 422/101; 422/102; 422/104; 435/288.4; 435/288.5; 435/297.1; 435/303.1; 439/305.2
[58] Field of Search ..................................... 422/101, 102, 422/104; 935/88; 435/288.4, 288.5, 297.1, 303.1, 305.2

[56] References Cited

U.S. PATENT DOCUMENTS

| | | |
|---|---|---|
| 4,111,754 | 9/1978 | Park . |
| 4,493,815 | 1/1985 | Fernwood et al. . |
| 4,526,690 | 7/1985 | Kiovsky et al. . |
| 4,598,049 | 7/1986 | Zelinka et al. . |
| 4,894,343 | 1/1990 | Tanaka et al. . |

(List continued on next page.)

FOREIGN PATENT DOCUMENTS

| | | |
|---|---|---|
| 1 304 916 | 7/1992 | Canada . |
| 0 403 679 | 12/1990 | European Pat. Off. . |
| 0 787 527 | 8/1997 | European Pat. Off. . |
| 196 02 464 | 7/1997 | Germany . |
| 1 509 826 | 5/1978 | United Kingdom . |
| WO 90/02605 | 3/1990 | WIPO . |
| WO91/07504 | 5/1991 | WIPO . |
| WO 92/02303 | 2/1992 | WIPO . |
| WO 94/06902 | 3/1994 | WIPO . |
| WO94/05394 | 3/1994 | WIPO . |
| WO94/14972 | 7/1994 | WIPO . |
| WO95/01559 | 1/1995 | WIPO . |
| WO 95/11262 | 4/1995 | WIPO . |
| WO96/03212 | 2/1996 | WIPO . |
| WO96/16078 | 5/1996 | WIPO . |
| WO 96/30761 | 10/1996 | WIPO . |
| WO 96/33010 | 10/1996 | WIPO . |
| WO96/42004 | 12/1996 | WIPO . |
| WO97/06890 | 2/1997 | WIPO . |
| WO 97/10896 | 3/1997 | WIPO . |
| WO97/09353 | 3/1997 | WIPO . |
| WO97/42216 | 11/1997 | WIPO . |
| WO 97/45443 | 12/1997 | WIPO . |
| WO97/45455 | 12/1997 | WIPO . |
| WO98/05424 | 2/1998 | WIPO . |
| WO98/06490 | 2/1998 | WIPO . |
| WO98/08092 | 2/1998 | WIPO . |

OTHER PUBLICATIONS

This reference is a picture of HP 7686 Solution–Phase Synthesizer by Hewlett Packard.
This reference is a picture of a MultiReactor™ Synthesizer by RoboSynthon, Inc.

(List continued on next page.)

*Primary Examiner*—Jan Ludlow
*Attorney, Agent, or Firm*—Darin J. Gibby; Lauren L. Stevens

[57] ABSTRACT

The invention provides systems, devices and methods for synthesizing various chemicals onto solid supports, cleaving the synthesized compounds and preparing samples for analysis. In one exemplary embodiment, the invention provides a device comprising a housing which defines an enclosure. A plate having a plurality of wells is received into the enclosure. Each of the wells has a bottom end and at least some of the wells have a hole in the bottom end. A pressure source is in fluid communication with the holes in the bottom ends of the wells. In this manner, a fluid may be maintained within the wells by application of pressure from the pressure source.

14 Claims, 9 Drawing Sheets

U.S. PATENT DOCUMENTS

| | | |
|---|---|---|
| 4,948,442 | 8/1990 | Manns . |
| 5,047,215 | 9/1991 | Manns . |
| 5,108,704 | 4/1992 | Bowers et al. . |
| 5,147,608 | 9/1992 | Hudson et al. . |
| 5,183,744 | 2/1993 | Kawamura et al. . |
| 5,186,844 | 2/1993 | Burd et al. . |
| 5,219,528 | 6/1993 | Clark . |
| 5,272,081 | 12/1993 | Weinreb et al. . |
| 5,273,718 | 12/1993 | Sköld et al. . |
| 5,288,464 | 2/1994 | Nokihara . |
| 5,308,757 | 5/1994 | Kawamura et al. . |
| 5,324,483 | 6/1994 | Cody et al. . |
| 5,384,261 | 1/1995 | Winkler et al. . |
| 5,457,527 | 10/1995 | Manns et al. . |
| 5,472,672 | 12/1995 | Brennan . |
| 5,503,805 | 4/1996 | Sugarman et al. . |
| 5,506,141 | 4/1996 | Weinreb et al. . |
| 5,516,491 | 5/1996 | Kath et al. . |
| 5,529,756 | 6/1996 | Brennan . |
| 5,565,324 | 10/1996 | Still et al. . |
| 5,585,275 | 12/1996 | Hudson et al. . |
| 5,599,688 | 2/1997 | Grass . |
| 5,604,130 | 2/1997 | Warner et al. . |
| 5,609,826 | 3/1997 | Cargill et al. . |
| 5,620,894 | 4/1997 | Barger et al. . |
| 5,622,699 | 4/1997 | Ruoslahti et al. . |
| 5,639,428 | 6/1997 | Cottingham . |
| 5,650,489 | 7/1997 | Lam et al. . |
| 5,665,975 | 9/1997 | Kedar . |
| 5,688,696 | 11/1997 | Lebl . |
| 5,712,171 | 1/1998 | Zambias et al. . |
| 5,725,831 | 3/1998 | Reichler et al. . |
| 5,770,157 | 6/1998 | Cargill et al. . |

OTHER PUBLICATIONS

This reference is a picture of a Stem Reacto–Stations™ Synthesizer by Stem Corporation.

This reference is a picture of an RS 1000 with air–cooled reflux module.

This reference is a picture of a RAM™ Synthesizer.

This reference is a picture of a Nautilus™ 2400 Synthesizer by Argonaut Technologies, Inc.

This reference is a picture of a Model 496 Multiple Organic Synthesizer by Advanced ChemTech.

This reference is a picture of MicroKans® and Micro-Tubes® by IRORI. These are used in an AccuTag™100 Combinatorial Chemistry System by IRORI.

This reference is a picture of an AutoSort™–10K Microreactor Sorting System by IRORI.

This reference is a picture of SOPHAS M Solid Phase Synthesizer by Zinsser Analytic.

This reference is a picture of a Quest 210 Synthesizer by Argonaut Technologies.

This refers to pictures of an APOS 1200 Synthesizer by Rapp Polymere GmbH.

Baiga (1998), "Integrated Instrumentation for High–Throughput Organic Synthesis," Presented at Cambridge Healthtech Institute's Third Annual Symposium "High–Throughput Organic Synthesis", Mar. 5–6, Coronodo, California.

Baldwin et al. (1995), "Synthesis of a Small Molecule Library Encoded with Molecular Tags," J. Am. Chem. Soc. 117:5588–5589.

Bergot (1998), "Combinatorial Chemistry Workstation to Facilitate Pharmaceutical Development," Presented at Cambridge Healthtech Institute's Third Annual Symposium "High–Throughput Organic Synthesis", Mar. 5–6, Coronodo, California.

Brenner and Lerner (1992), "Encoded combinatorial chemistry," Proc. Natl. Acad. Sci. U.S.A. 89:5381–5383.

Campbell (1998), "Automating Solid–Phase Synthesis without Compromise," Presented at Cambridge Healthtech Institute's Third Annual Symposium "High–Througput Organic Synthesis," Mar. 5–6, Coronodo, California.

Cargill et al. (1995), "Automated Combinatorial Chemistry on Solid Phase," Proceedings of the International Symposium on laboratory Automation and Robotics 1995. Zymark Corporation, Zymark Center, Hopkinton, MA, pp. 221–234.

Cargill et al. (1996), "Automated Combinatorial Chemistry on Solid Phase," Laboratory Robotics and automation, 8:139–148.

Czarnik, A.W. (1997) No static at all: using radiofrequency memory tubes without (human) interference. Abstract at the Association for Laboratory Automation Labautomation 97 Conference, 1997 Jan. 18–22, San Diego. On the World Wide Web URL http://labautomation.org.

Czarnik and Nova (1997), "No static at all." Chemistry in Britain, Oct., pp. 39–41.

Daniels et al. (1990), "Membranes as novel solid supports for peptide synthesis," Peptides, Proceedings of the Eleventh American Peptide Symposium Jul. 9–14, 1998 (Rivier and Marshall, eds.), pp. 1027–1028.

DeWitt et al. (1996), "Combinatorial Organic Synthesis Using Park–Davis Diversomer Method," Acc. Chem. Res. 29:114–122.

DeWitt et al. (1994), "Diversomer technology: solid phase synthesis, automation, and integration for the generation of chemical diversity," Drug Dev. Res. 33:116–124.

DeWitt et al. (1996), "A modular System for combinatorial and Automated Synthesis" in "Molecular Diversity and Combinatorial Chemistry: Libraries and Drug Discovery. ACS Conference Proceedings Series" (Chaiken and Janda Eds.) pp. 207–218. American Chemical Society, Washington DC.

DeWitt et al. (1995), "Automated synthesis and combinatorial chemistry," current Opinion in Biotechnology 6:640–645.

DeWitt et al. (1993), "Diversomers": An approach to nonpeptide, nonoligomeric chemical diversity. Proc. Natl. Acad. Sci. U.S.A. 90:6909–6913.

Floyd et al. (1997), "The Automated Synthesis of Organic Compounds—some Newcomers Have Some Success" in "Proceedings of the International Symposium on Laboratory Automation and Robotics 1996" pp. 51–76. Zymark Corporation, Zymark Center, Hopkinton, MA.

Frank (1994), "Spot–synthesis: An easy and flexible tool to study molecular recognition," Innovation and Perspectives in Solid Phase Synthesis, (Epton, ed.), pp. 509–512.

Frank et al. (1988), "Simultaneous multiple peptide synthesis under continuous folw conditions on cellulose paper discs as segmental solid supports," Tetrahedron 44:6031–6040.

Furka et al. (1991), "General method for rapid synthesis of multicomponent peptide mixtures," Int. J. Pept. Protein Res. 37:487–493.

Gooding et al. (1996), "Boosting the Productivity of Medicinal Chemistry Through Automation Tools, Novel Technological Developments Enable a Wide Range of Automated Synthetic Procedures" in "Molecular Diversity and Combinatorial chemistry: Libraries and Drug Discovery. ACS Conference Proceedings Series" (Chaiken et al.) pp. 199–206. American Chemical Society, Washington, DC.

Harness (1996), "Automation of High–Throughput Synthesis. Automated Laboratory Workstations Designed to Perform and Support Combinatorial Chemistry" in "Molecular Diversity and Combinatorial Chemistry: Libraries and Drug Discovery. ACS Conference Proceedings Series" (Chaiken et al.) pp. 188–198. American Chemical Society, Washington, DC.

Kerr et al. (1993), "Encoded combinatorial peptide libraries containing non–natural amino acids," J. Am. Chem. Soc. 115:2529–2531.

Lam et al. (1991), "A new type of synthetic peptide library for identifying ligand–binding activity," Nature (London), 354:82–84.

Lashkari et al. (1995), "An automated multiplex oligonucleotide synthesizer: Development of high–throughput, low––cost DNA synthesis," Proc. Natl. Acad. Sci. USA 92:7912–7915.

Lebl et al. (1995), "One–bead–one–structure combinatorial libraries," Biopolymers, 37:177–198.

Meyers et al., "Multiple simultaneous synthesis of phenolic libraries," ESCOM Science Publishers B.V., Leiden, The Netherlands, Copyright 1995, Mol. Diversity, 1:13–20.

Meyers et al. (1996), "Versatile method for parallel synthesis," Methods Mol. Cell. Biol. (1996), 6:67–73.

Mjalli (1997), "Application of Automated Parallel Synthesis" in "A Practical Guide to Combinatorial Chemistry" (Czarnik et al.) pp. 327–354. American Chemical Society, Washington, DC.

Moran et al. (1995), "Radio Frenquency Tag Encoded Combinatorial Library Method for the Discovery of Tripeptide–Substituted Cinnamic Acid Inhibitors of the Protein Tyrosine Phosphatase PTP1B," J. Am. Chem. Soc. 117:10787–10788.

Nakazawa (1994), "Chapter 20. The anisotropic principle," in Principles of Precision Engineering, Oxford University Press, pp. 212–228.

Nestler et al. (1994), "A General Method for Molecular Taggin of Encoded Combinatorial Chemistry Libraries," J. Org. Chem. 59:4723–4724.

Ni et al. (1996), "Versatile Approach to Encoding combinatorial Organic Syntheses Using Chemically Robust Secondary Amine Tags," J. Med. Chem. 39:1601–1608.

Nicolau et al. (1995), "Radiofrequency encoded combinatorial chemistry," Angew. Chem. Int. Ed. 34:2289–2291.

Nielson et al. (1993), "Synthetic methods for the implementation of encoded combinatorial chemistry," J. Am. Chem. Soc. 115:9812–9813.

Nikolaev et al. (1993), "Peptide–encoding for structure determination of nonsequenceable polymers within libraries synthesized and tested on solid–phase supports," Pept. Res. 6:161–170.

Ohlmeyer et al. (1993), "Complex synthetic chemical libaries indexed with molecular tags," Proc. Natl. Acad. Sci. U.S.A. 90:10922–10926.

Porco et al. (1988), "Automated chemical synthesis: chemistry development on the Nautilus 2400TM," Drugs of the Future 23:71–78.

Powers et al. (1998), "Personal Synthesizer for HTS," Genetic Eng. News, 18, No. 3, p. 14.

Rivero et al. (1997), "Equipment for the High–Throughput Organic Synthesis of Chemical Libraries" in "A Practical Guide to combinatorial chemistry" (Czarnik et al.) pp. 281–307. American Chemical Society, Washington, DC.

Salmon et al. (1993), "Discovery of biologically active peptides in random libraries: solution–phase testing after staged orthogonal release from resin beads," Proc. Natl. Acad. Sci. U.S.A. 90:11708–11712.

Stanchfield (1997), "FlexChemTM: A Modular System for High Throughput Synthesis of Small Molecules," Robbins Innovations, 5, No. 4, pp. 1–6.

Stanchfield (1998), "A Flexible, Modular System for Performing High–Throughput Synthesis of Small Molecules," Presented at Cambridge Healthtech Institute's Third Annual Symposium "High–Throughput Organic Synthesis", Mar. 5–6, Coronodo, California.

Terrett et al. (1997), "Drug discovery by combinatorial chemistry—The development of a novel method for the rapid synthesis of single compounds," Chem. Eur. J. 3:1917–1920.

Veldkamp and McHugh (May 1992), "Binary Optics," Scientific American, pp. 92–97.

Whitten et al. (1996), "Rapid Microscale Synthesis, a New Method for Lead optimization Using Robotics and Solution Phase Chemistry: Application to the Synthesis and Optimization of Corticotropin–Releasing Factor Receptor Antagonists," J. Med. Chem. 39:4354–4357.

Brochure, "Millipore MultiScreen Assay System," Millipore Corporation, Bedford, MA 01730, Rev. B 9/91, 14 pages.

Lashkari et al. (1995), Proc. Natl. Acad. Sci. USA, "An automated multiplex oligonucleotide synthesizer: Development of high–throughput, low–cost DNA synthesis.".

Multiblock—Instrument for multiple and combinatorial synthesis—Brief Description and User's Manual, 5 pages.

Meyers et al., "Multiple simultaneous synthesis of phenolic libraries," ESCOM Science Publishers B.V., Leiden, The Netheralands, Copyright 1995, 16 pages.

Product Brochure for a reaction block for "Combinatorial Chemistry," by SyRo, 1 page.

Product Brochure, "Alchemy 2000 Automated Reaction System," Sagain Incorporated, 3 pages.

SYSTEM AND METHODS FOR PARALLEL SYNTHESIS OF ORGANIC COMPOUNDS

This is a division of application Ser. No. 08/736,317 filed Oct. 23, 1996, now U.S. Pat. No. 6,042,789.

BACKGROUND OF THE INVENTION

The invention relates generally to the field of chemical synthesizers. More particularly, the invention provides devices, systems and methods for synthesizing various diverse chemical products onto solid supports, such as beads, cleaving the synthesized compounds from the beads and preparing samples for analysis.

Diverse chemical products find a wide variety of uses, such as in drug discovery, genetic studies and the like. Exemplary diverse chemical products that are useful in scientific studies include peptides, oligonucleotides, and other related materials.

The creation and analysis of diverse chemical products typically proceeds by synthesizing diverse collections of molecules onto a plurality of solid supports, such as beads. For many applications, it is desirable to simultaneously synthesize a wide variety of compounds onto the beads in a high throughput mode. In this manner, numerous compounds may be simultaneously synthesized in a single process, commonly referred to as parallel synthesis. To do so, a variety of synthesizers and techniques have been proposed, such as, for example, those described in U.S. application Ser. Nos. 08/146,886, filed Nov. 2, 1993, (Attorney Docket No. 16528-000730), now U.S. Pat. No. 5,639,603 and 08/722,657, filed Sep. 27, 1996, (Attorney Docket No. 16528A-022300), now U.S. Pat. No. 5,866,342, the disclosures of which are herein incorporated by reference.

During the process of synthesis, the beads (which are typically held within a well) are exposed to various liquids. For example, a typical process proceeds by exposing the beads to various reagents. Following this step, the beads are washed several times with a washing solution. Unfortunately, the introduction and removal of such liquids to and from the wells can be extremely time consuming and labor intensive. After the compounds have been synthesized, the compounds are usually cleaved from the beads, organized into samples and analyzed. Such steps are also time consuming and labor intensive since cleavage typically requires a cleavage solution to be introduced into the wells. Following cleavage, the removed compounds must then be organized into sample wells for analysis.

If is often preferable to transfer the cleaved compounds into the wells standard sized microtiter plates because such plates may then be used with most commercially available handling and processing equipment. For example, most automated plate readers, some speed vacuum concentrators, autosamplers, robotics liquid handling equipment, and the like require the samples to be placed into standard sized microtiter plates. However, the time and labor required to manually place samples into such plates can be extensive and considerably slow the process.

Hence, the time required for actual synthesis of the compounds onto the beads is minimal compared to the other steps in the overall process, e.g., the introduction and removal of various liquids and chemicals to and from the reaction wells, the transfer of the cleaved compounds into sample wells, and the like. Therefore, it would be desirable to provide systems, devices and methods which would reduce the amount of time and labor required to complete such steps when simultaneously synthesizing large numbers of diverse compounds onto beads. It would be particularly desirable if such systems, devices and methods allowed for synthesis to occur using standard filling equipment so that the time and labor required to introduce and remove various liquids would be reduced. For example, it would be beneficial if standard multi-channel pipette systems or automated fluid delivery systems could be employed to introduce the various liquids into the reaction wells. It would also be desirable if the cleaved compounds could rapidly and efficiently be placed into the wells of standard sized microtiter plates so that the samples may be rapidly evaluated with commercially available handling and processing equipment.

SUMMARY OF THE INVENTION

The invention provides systems, devices and methods for efficiently synthesizing various diverse chemical compounds onto solid supports, cleaving the synthesized compounds from the solid supports, and placing the cleaved compounds into the wells of standard size microtiter plates so that commercially available analyzation equipment may be employed to rapidly and efficiently analyze the compounds. In one exemplary embodiment, the invention provides a device for processing articles, such as solid supports, which comprises a housing defining an enclosure. A plate having a plurality of wells is received into the enclosure. Each well includes a bottom end, with at least some of the bottom ends having a hole extending therethrough. A pressure source is placed in fluid communication with the holes in the bottom ends of the wells to maintain the fluid within the wells by application of pressure from the pressure source.

The device preferably further includes a vacuum source which is also in fluid communication with the holes in the bottom ends of the wells to assist in transferring fluids from the wells by application of negative pressure from the vacuum source. In one exemplary aspect, a seal is provided between the plate and the housing such that the housing and the seal define a manifold. With this arrangement, the pressure and vacuum sources are operably connected to an opening in the manifold so that the fluid may be maintained within or transferred from the wells by applying positive or negative pressure to the manifold. Preferably, the pressure source comprises a source of inert gas which is introduced into the manifold and equally distributed to the bottom ends of the wells.

In some cases, the inert gas will tend to bubble through the fluid contained within the wells. Hence, in one particular aspect, a pressure regulator is operably connected to the pressure source so that a generally constant pressure may be maintained at the bottom ends of the wells. In this manner, the fluids will not leak through the bottom ends of the wells, even when the inert gas bubbles through the fluids in the wells.

In another particular aspect, the housing comprises a top half and a bottom half which mate together to form the enclosure. With this arrangement, the seal preferably comprises a resilient gasket which at least partially sits between the top half and the bottom half. In this manner, the housing compresses the seal which in turn causes the seal to expand against the plate.

In still another aspect, the plate includes ninety-six wells so that it will be compatible with commercially available filling and processing equipment. For example, configuration of the plate in this manner allows for various liquids to be introduced into the wells using multi-channel pipettes or other automated filing equipment which are compatible with the 96-well format. In yet another aspect, a frit is disposed within at least some of the wells so that the solid supports onto which the chemical compounds are synthesized may be suspended within the wells. Preferably, the frits comprise teflon screens.

In yet another aspect, the manifold includes a bottom section which is tapered toward the opening. The tapered section assists in draining fluids through the opening following synthesis and washing. In another particular aspect, the housing includes an aperture in the top plate for providing access to the wells. A lid is preferably provided for covering the aperture. The lid is advantageous in that it captures the inert gasses bubbled through the fluids to produce a generally inert atmosphere during synthesis.

Optionally, a second or bottom plate may be provided and will be configured to be stacked below the first or top plate. In this manner, when the combined plates are placed into the enclosure the synthesized compounds may be cleaved from the solid supports and drained into the bottom plate where they will be available for subsequent analysis.

The invention further provides an exemplary system for processing articles, such as solid supports, onto which various compounds are to be synthesized. The system comprises a synthesizing device comprising a first housing defining a first enclosure. A cleaving device is also provided and comprises a second housing defining a second enclosure. The system further includes a first plate having a plurality of wells, with each well having a bottom end, and with at least some of the wells having a hole in the bottom end. A second plate is further provided and includes a plurality of wells. The plates are configured so that the first plate may be placed on top of the second plate to allow fluids from the top plate to drain into the wells of the second plate. With this arrangement, the synthesizing device enclosure may be configured to receive the first plate so that compounds can be synthesized onto solid supports when in the synthesizing device. Following synthesis, the first plate may be removed from the synthesizing device and stacked on top of the second plate. The combined plates may then be placed into the cleaving device so that the compounds may be cleaved from the solid supports held within the first plate and drained into the second plate. Following cleavage, the second plate may be placed into commercially available process and analyzation equipment for analysis of the various compounds.

The invention still further provides an exemplary method for synthesizing compounds. According to the method, a plate is provided having a plurality of wells. At least some of the wells have a hole in the bottom end, and a frit is disposed in at least some of the wells. A plurality of solid supports are placed into the wells and an inert gas is applied to the bottom ends of the wells. At least one reagent is introduced into the wells, with the reagent being held within the wells by the positive pressure of the inert gas. Following synthesis, application of the positive pressure is ceased and the reagent is drained from the wells through the holes in the bottom end.

In one exemplary aspect, the draining step comprises applying a vacuum to the bottom ends of the wells. Following removal of the reagent, a washing solution is preferably introduced into the wells while positive pressure is reapplied with the inert gas to maintain the washing solution in the wells. Following washing, the washing solution is drained from the wells through the holes in the bottom end.

In another aspect of the method, a cleaving solution is introduced into the wells after the solid supports have been washed. Positive pressure is preferably applied with the inert gas to maintain the cleaving solution within the wells. Preferably, the cleaving solution will be drained from the wells into the wells of a second plate which is positioned below the first plate. A vacuum may be applied to the bottom ends of the wells of the first plate when the second plate is positioned below the bottom ends of the first plate to assist in draining the cleaved compounds. Following cleavage, assays are preferably performed on the solutions in the wells of the second plate. Preferably, the plates will be standard sized so that they will be compatible with commercially available filling and analyzation equipment. In this way, the wells may be rapidly filled with the necessary chemical solutions, and the cleaved compounds may be rapidly prepared into samples and analyzed using conventional equipment.

DETAILED DESCRIPTION OF THE SPECIFIC EMBODIMENTS

Figure 1:
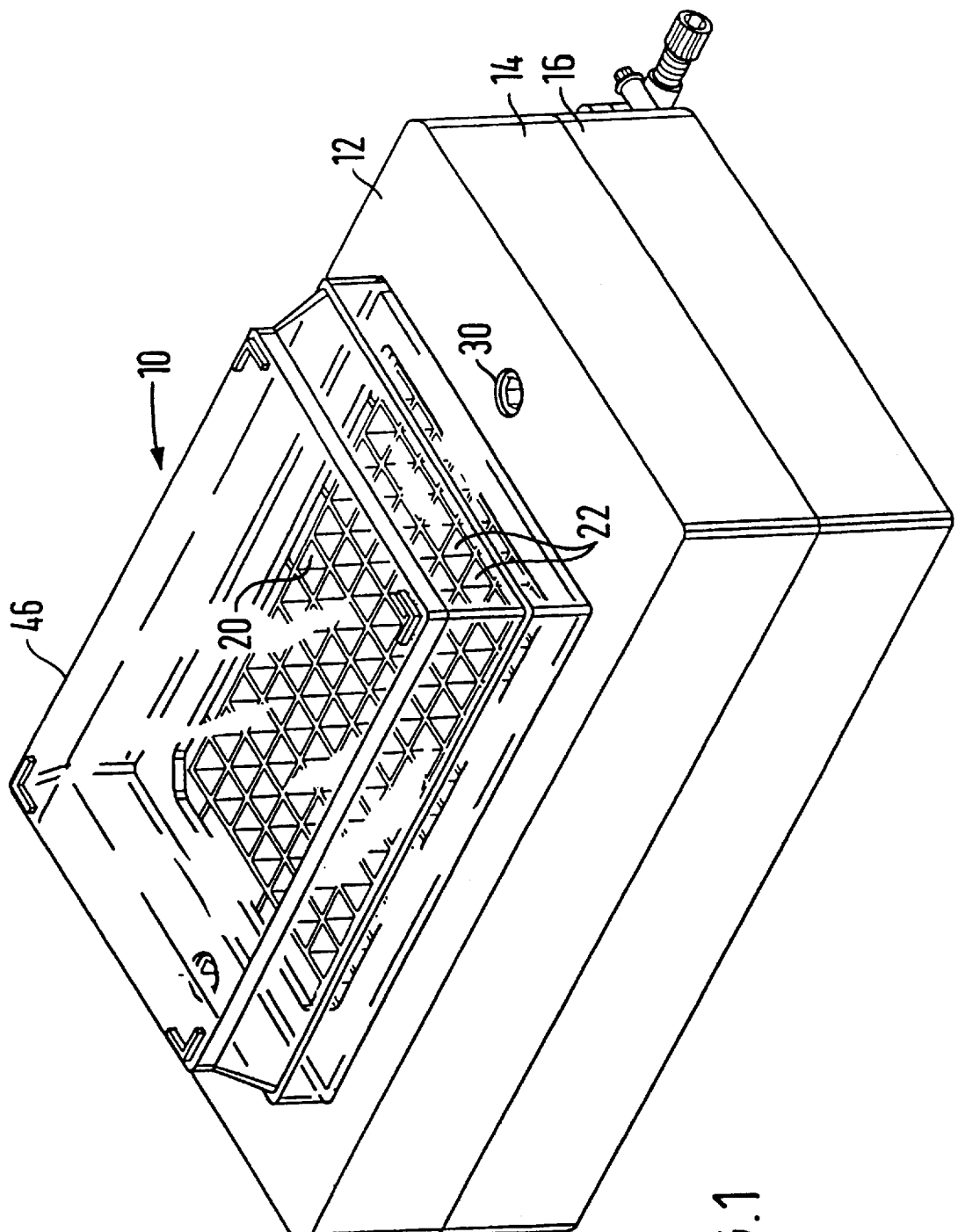
FIG. 1 is a perspective view of an exemplary chemical synthesizer according to the present invention.
Figure 2:
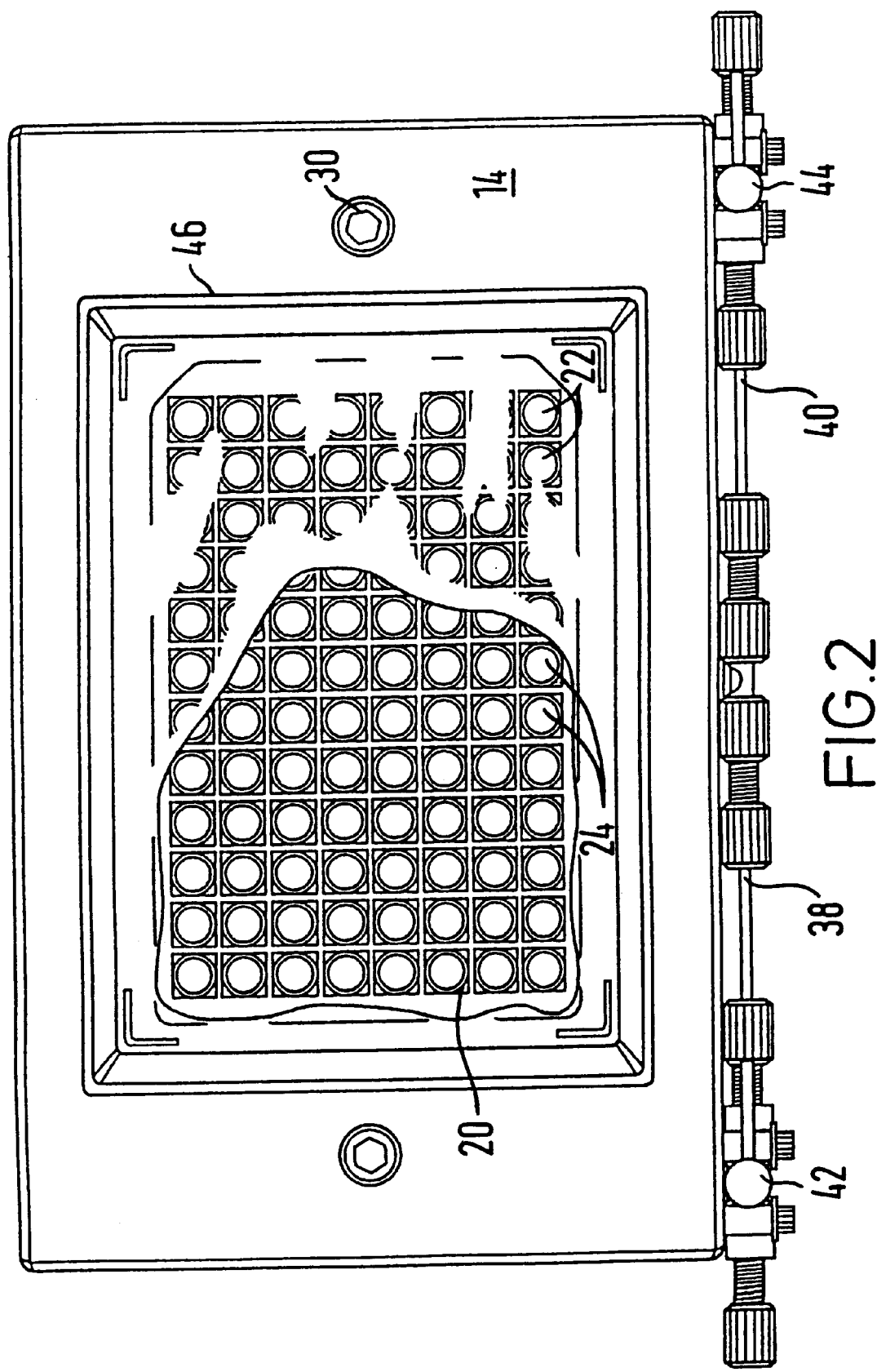
FIG. 2 is a top view of the synthesizer of FIG. 1.
Figure 3:
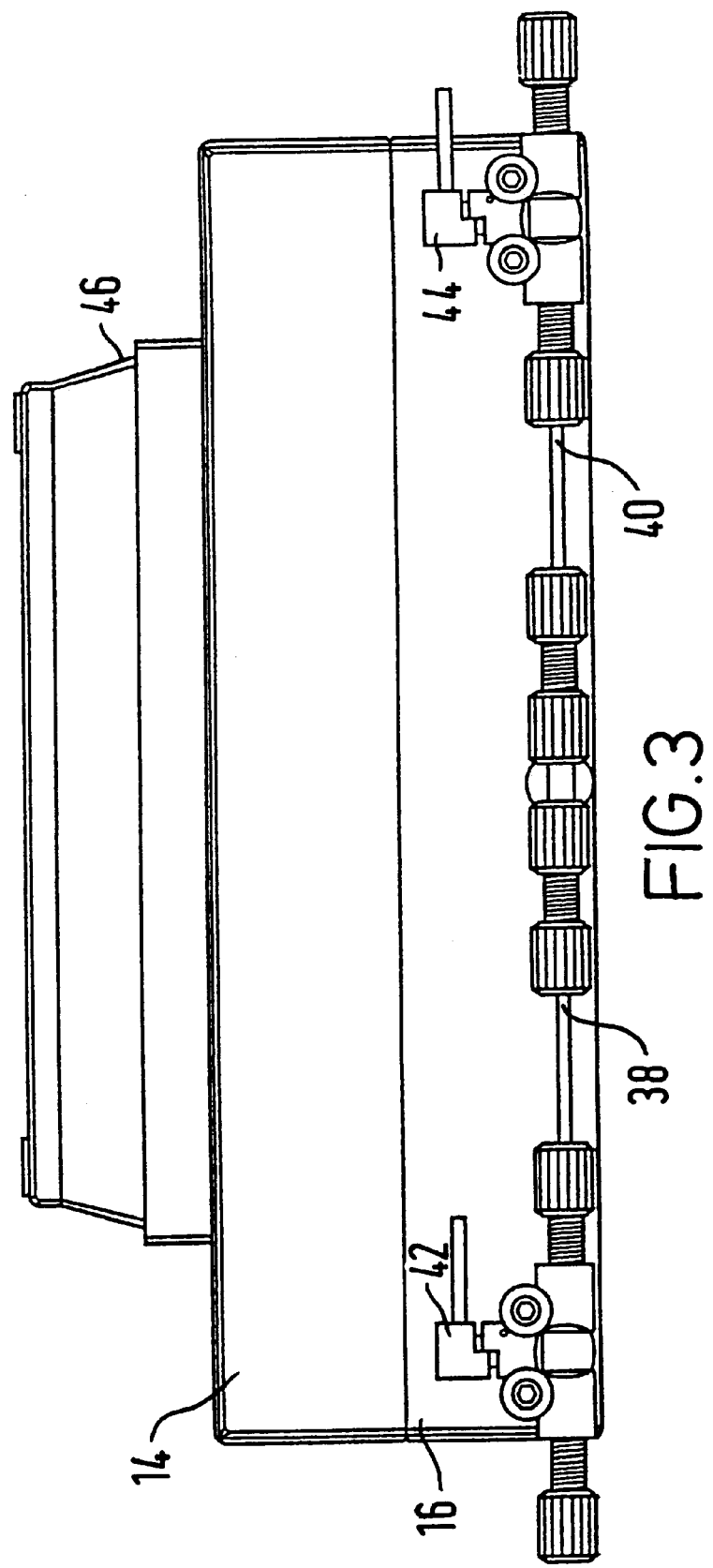
FIG. 3 is a side view of the synthesizer of FIG. 1.

The invention provides systems, devices and methods for simultaneously synthesizing large numbers of diverse chemical compounds onto solid supports and then cleaving the synthesized compounds from the supports in an efficient manner so that they will be prepared to be analyzed by commercially available analyzation equipment. In this manner, an efficient process is provided whereby diverse chemical compounds may be synthesized, cleaved, and organized into samples for analysis.

The invention will preferably employ the geometric configuration of standard microtiter plates throughout the entire process so that synthesis (including the steps of introducing various chemical compounds to the beads), cleavage, sample preparation and analytical data collection may all occur using standard equipment. In this manner, the time and effort required for chemical introduction, washing, cleavage and sample preparation is greatly reduced thereby making the overall process extremely efficient. For example, by having the reaction wells organized into a standard format, automated filling equipment and multi-channel pipettes may be employed to introduce various chemicals into the wells. Further, by having the cleaved compounds already organized into microtiter plate wells, standard equipment such as plate readers, speed vacuum concentrators, autosamplers, robotics liquid handling equipment, and the like may be employed as needed to analyze the compounds. Usually, the microtiter plates will include ninety-six wells, although other numbers of wells may be included depending on the particular application and available equipment.

The invention allows for efficient cleavage and sample preparation by synthesizing the various compounds in a plate having an array of wells. The wells have an opening in the bottom end so that following synthesis, the compounds may be cleaved and drained into a standard microtiter plate for subsequent analysis. In this way, sample preparation entails only the drainage of the cleaved compounds into the microtiter plate wells. To maintain the various fluids, such as reagents, washing solutions and cleavage solutions, within the wells, the invention provides the application of positive pressure to the holes in the bottom ends of the wells to prevent the fluids from leaking out. Preferably, a manifold is configured around the bottom of the plate so that a substantially uniform pressure will be applied at each bottom end. Preferably, an inert gas, such as argon, will be introduced into the manifold to maintain the fluids within the wells. To drain the fluids from the wells, application of the positive pressure is ceased and the fluids are allowed to drain through the holes. Optionally, a vacuum may be applied to the manifold to assist in draining the fluids from the wells. In this manner, fluids may be maintained within the wells for a significant period of time, i.e. on the order of days, while still being able to easily and efficiently remove the fluids from the wells when needed.

Referring now to FIGS. 1–4, an exemplary embodiment of a chemical synthesizer 10 will be described. Synthesizer 10 comprises a housing 12 which is constructed of a top half 14 and a bottom half 16. When top half 14 and bottom half 16 are placed together, they define an enclosure 18 (see FIG. 4) into which a multi-well plate 20 is received. Plate 20 includes ninety-six wells 22 which are sized to correspond to conventional multi-well plates as is known in the art. Held within each of the wells 22 is a frit 24 (see FIG. 2) onto which solid supports are placed. In this manner, the solid supports may be suspended within the wells during the synthesizing process. Preferably, the frits are constructed of a teflon screen. Frits 24 will preferably be press fit into the wells so that they are held within the wells by friction. As such, the frits will preferably be cylindrical and have a height which is in the range from about 3 mm to about 1 cm.

Each of wells 22 includes a bottom end 26 (see FIG. 4), each of which includes a small hole (not shown) for draining fluids from the wells. Although the size of the holes may vary, for applications including ninety-six wells, the holes will preferably have a size in the range from about 0.1 mm to about 2 mm. Such size allows fluids to be maintained within the wells when a positive pressure is applied as described in greater detail hereinafter. Moreover, such a size allows for the fluids to be drained from the wells when application of the positive pressure is ceased. Plate 20 will preferably be constructed by drilling holes into the well bottoms of a conventionally sized multi-well plate, such as those commercially available from Polyfiltronics.

Synthesizer 10 further includes a resilient gasket 28 (see FIG. 4) which partially rests between halves 14 and 16 when placed together. When bolts 30 are turned to cinch halves 14 and 16 securely together, gasket 28 is compressed forcing it against plate 20 as shown in FIG. 4A. When plate 20 is placed upon bottom half 16, a peg 41 is positioned against an interior side of plate 20 so as to bias plate 20 against gasket 28 when gasket 28 is compressed against plate 20. In this manner, a seal is created between housing 12 and plate 20. In this way, a sealed space 31 is provided between a bottom end 32 of plate 20 and bottom half 16. Space 31 functions as a manifold so that when either a positive or negative pressure is introduced into space 31 it will be evenly distributed at bottom ends 26 of wells 22.

Figure 4:
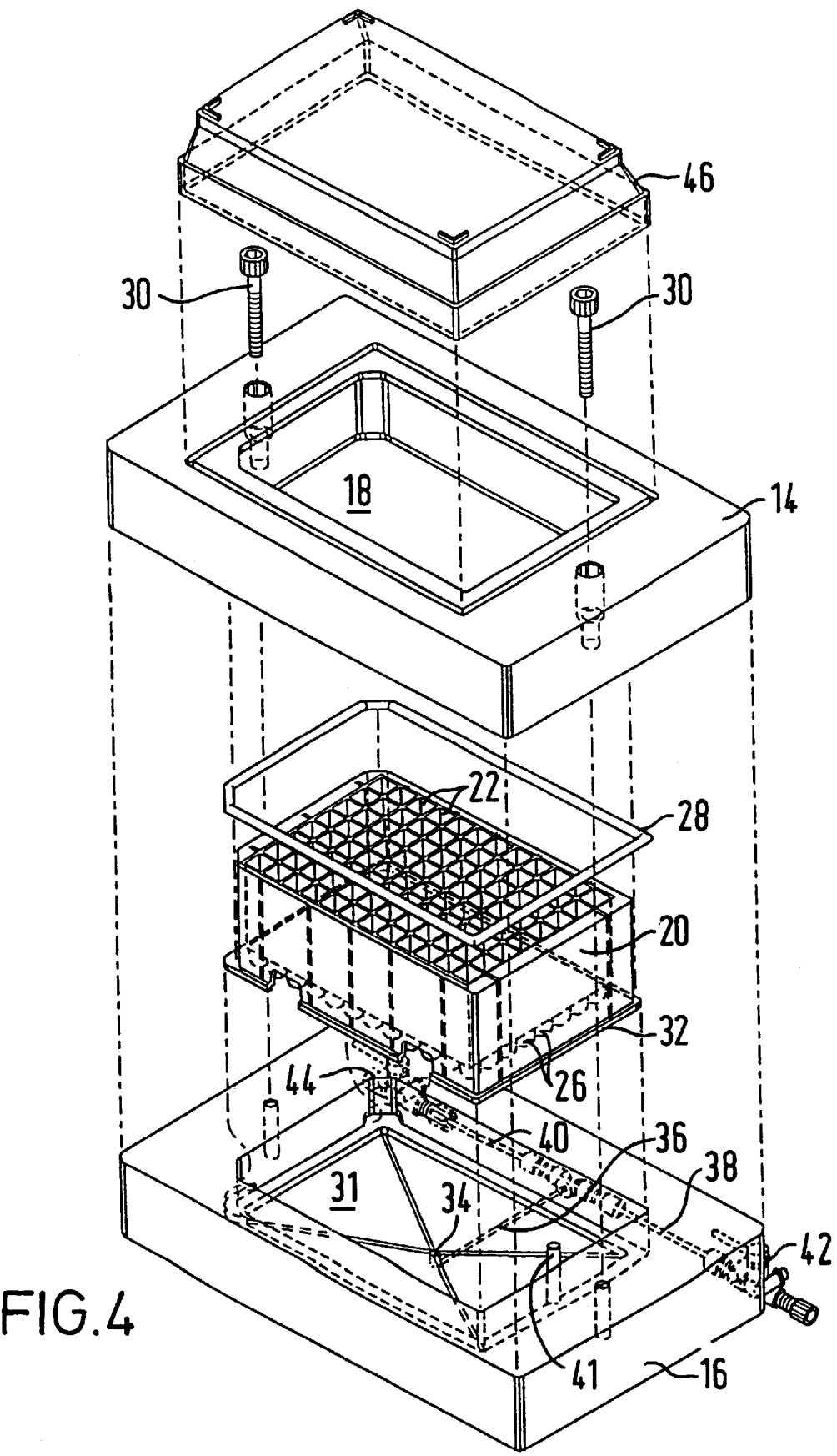
FIG. 4 is an exploded view of the synthesizer of FIG. 1.
Figure 4A:
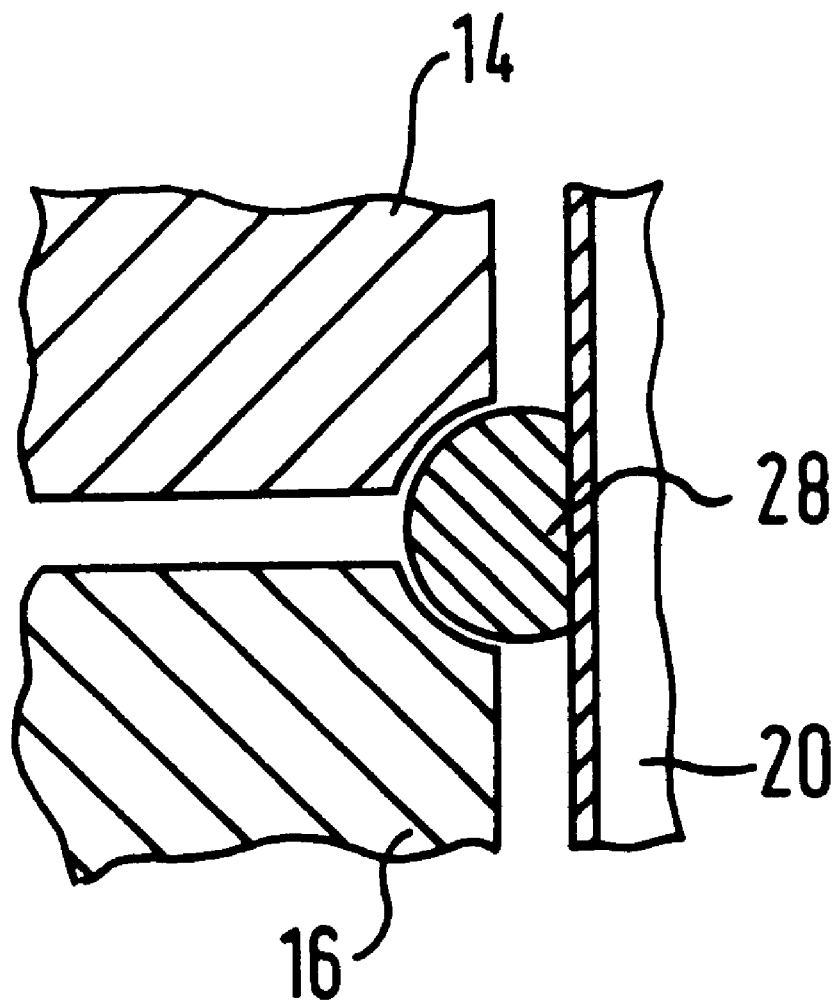
FIG. 4A is a cross sectional side view of a gasket of the synthesizer of FIG. 1 which is sealed against a multi-well plate.
Figure 5:
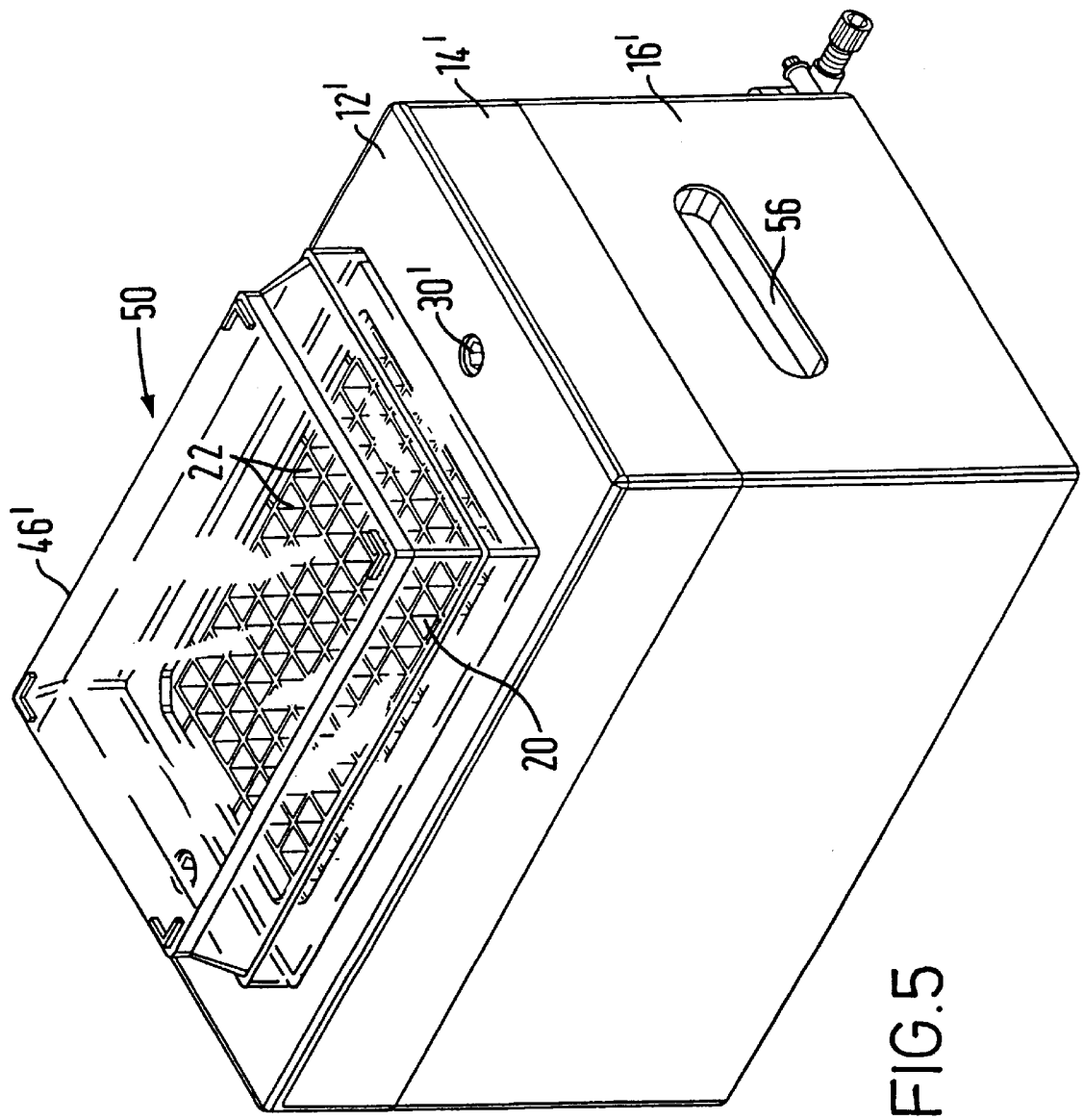
FIG. 5 is a perspective view of an exemplary cleavage device according to the present invention.
Figure 6:
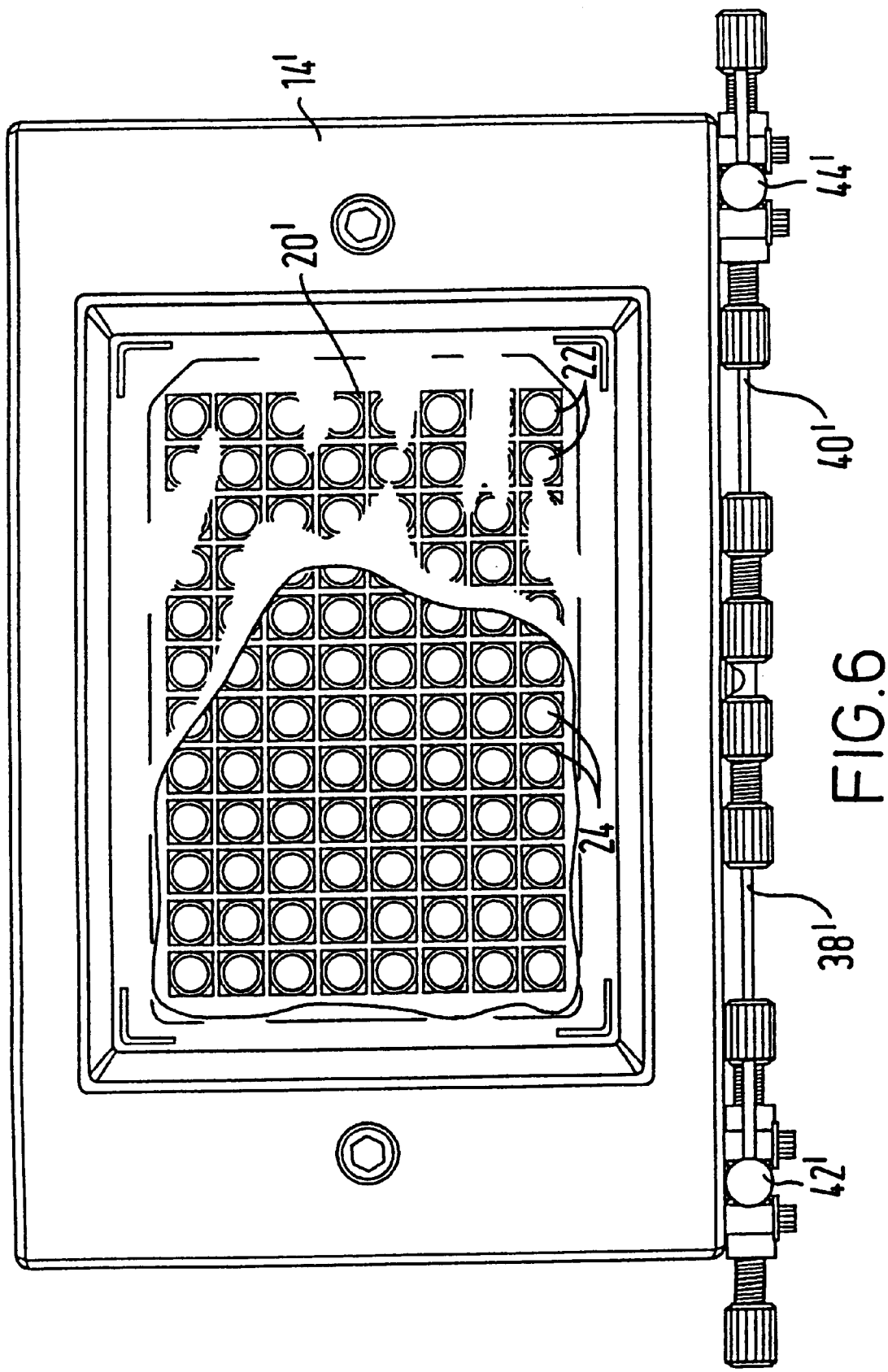
FIG. 6 is a top view of the cleavage device of FIG. 5.
Figure 7:
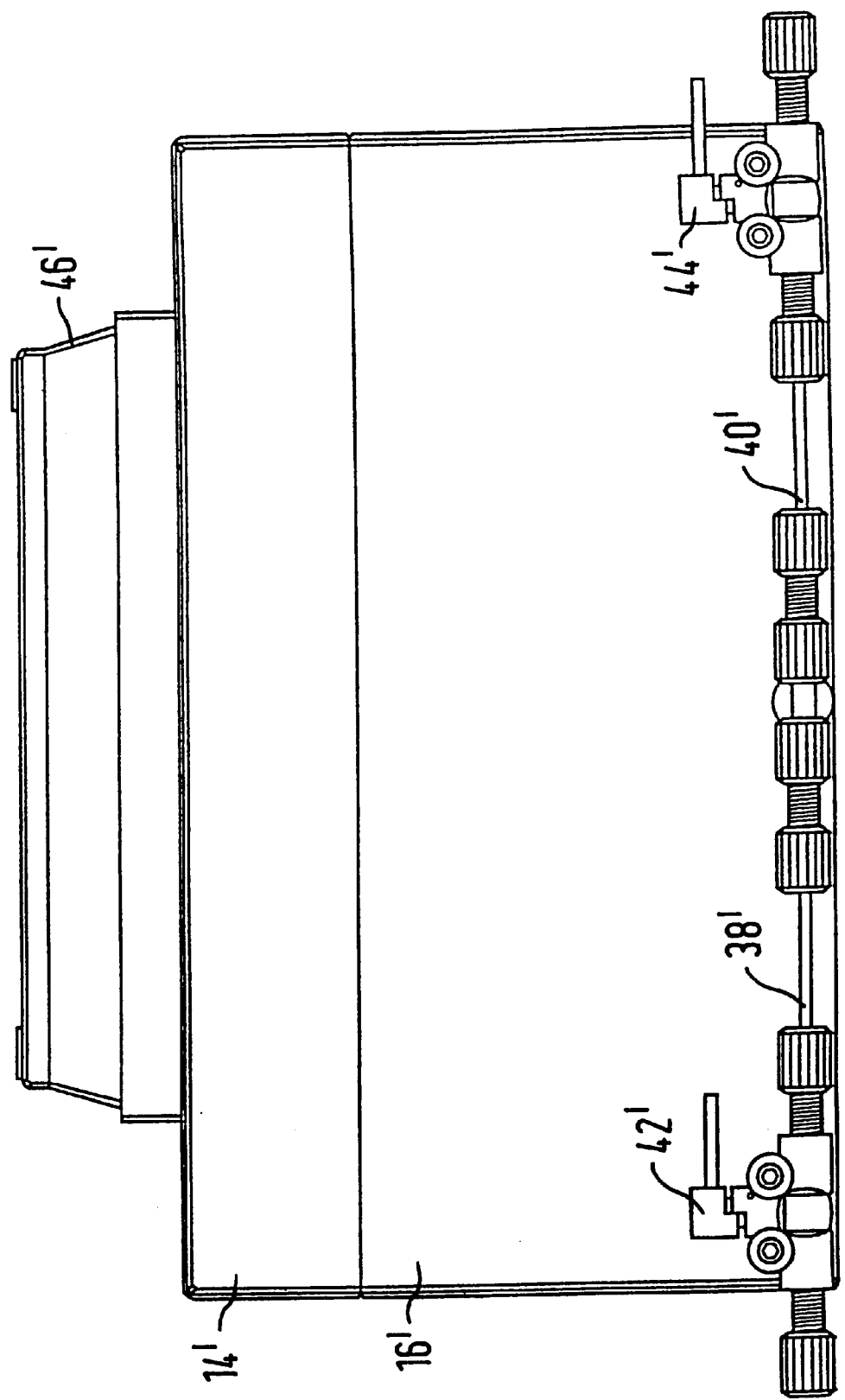
FIG. 7 is a side view of the cleavage device of FIG. 5.
Figure 8:
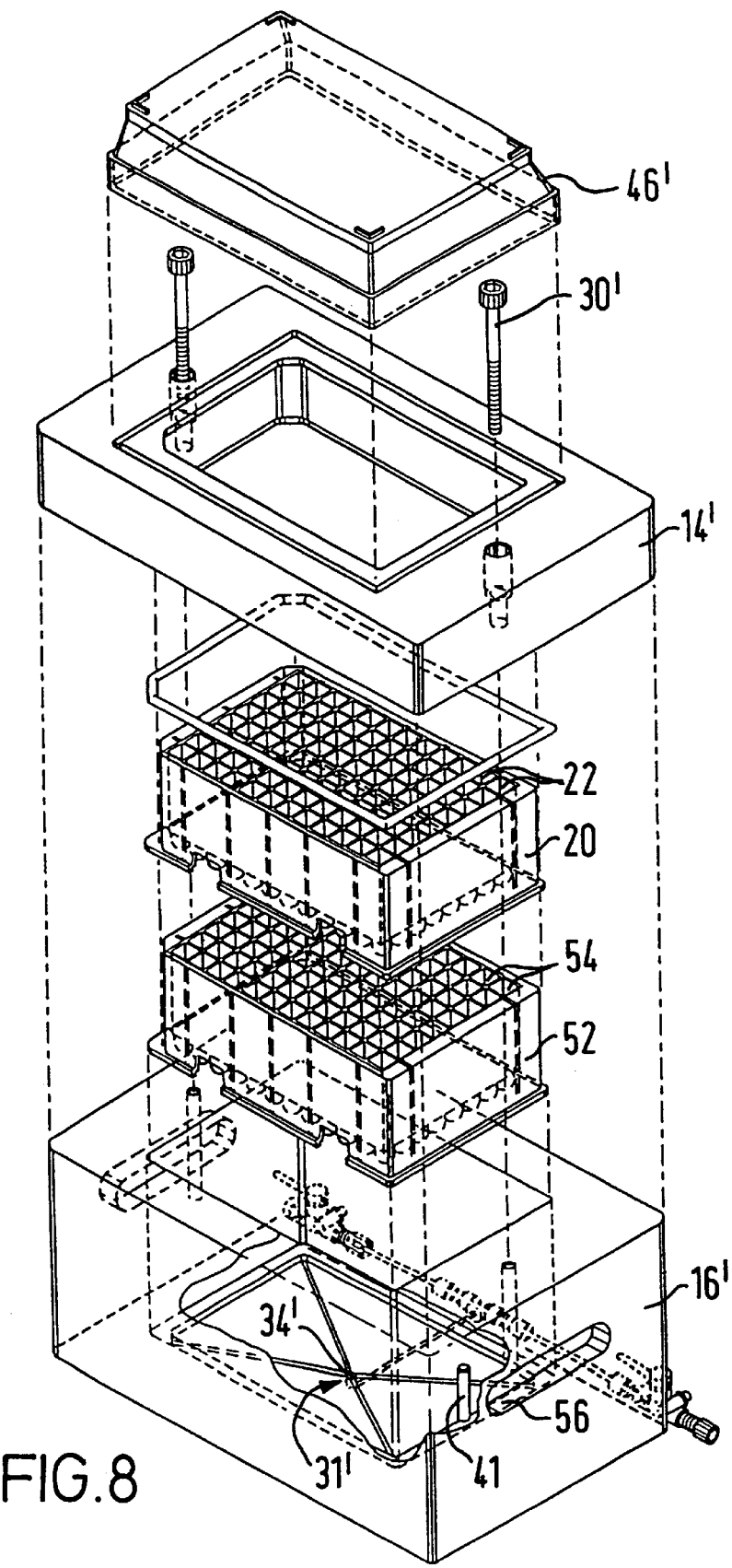
FIG. 8 is an exploded view of the cleavage device of FIG. 5.

As best shown in FIG. 4, an opening 34 is provided within bottom half 16 and allows for the introduction of either a positive or negative pressure into space 31. Optionally, space 31 may be tapered as shown to facilitate drainage of liquids from wells 22 through opening 34. Synthesizer 10 further includes a common line 36 (see FIG. 4), a pressure line 38 and a vacuum line 40. Pressure line 38 and vacuum line 40 are connected to common line 36 with a T-fitting. A pressure valve 42 is provided on line 38 and a vacuum valve 44 is provided on line 40. With this arrangement, a pressure source, such a source of inert gas, may be connected to pressure line 38 while a vacuum source may be connected to vacuum line 40. To introduce a positive pressure into space 31, pressure valve 42 is opened while vacuum valve 44 is closed. Alternatively, to produce a vacuum within space 31, pressure valve 42 is closed while vacuum valve 44 is opened. In this manner, fluids may be maintained within wells 22 by opening pressure valve 42 to create a generally uniform pressure within space 31. When fluids are ready to be drained from wells 22, valve 42 is closed and vacuum valve 44 is open. A vacuum is then created in space 31 which draws the fluids through the holes of the wells where they are drained through opening 34.

When liquids are included within wells 22 and pressure valve 42 is opened, the inert gas will tend to bubble through wells 22. To maintain a generally constant pressure within space 31, a pressure regulator (not shown) may be placed in communication with pressure line 38 to control the amount of gas being introduced into space 31. Synthesizer 10 also includes a lid 46 which is placed on top of top half 14 and serves to collect any inert gas bubbled through wells 22. In this manner, a generally inert environment is provided above wells 22 during synthesis and related processes.

Referring now to FIGS. 5–8, an exemplary embodiment of a cleavage device 50 will be described. Cleavage device 50 is essentially identical to chemical synthesizer 10 as previously described except for the size and shape of its enclosure. For convenience of discussion, analogous elements of cleavage device 50 will be referred to using the same reference numerals used to describe synthesizer 10 followed by a single quote "'".

Cleavage device 50 differs from chemical synthesizer 10 in that the enclosure 18 is sized and shaped to receive both multi-well plate 20 and a receiving multi-well plate 52. Receiving plate 52 preferably includes the same number of wells as plate 20. However, receiving plate 52 differs from plate 20 in that wells 54 of plate 52 do not include a frit and do not have holes in the bottom. In this manner, liquids from plate 20 may be drained into the wells 54 of receiving plate 52 when plate 20 is stacked on top of plate 52. Preferably, liquids will be drained from wells 22 of plate 20 and into wells 54 of plate 52 by opening vacuum line 44 to produce a negative pressure within space 31. Such a negative pressure will draw the liquids through the holes of wells 22 where it will fall with the assistance of gravity into wells 54. Halves 14 and 16 may then be separated and plate 52 removed for analysis of the removed compounds in conventional processing equipment. Optionally, plate 52 may be configured to be essentially identical to plate 20.

Optionally, cleavage device 50 may include handles 56 (see FIG. 5) within housing 12 to facilitate handling of the device.

Referring now to FIGS. 1–8, an exemplary method for synthesizing various compounds onto solid supports, cleaving the synthesized compounds and preparing them for analysis will be described. The synthesizing process begins by placing plate 20 within top half 14 and bottom half 16 of synthesizer 10. Bolts 30 are then tightened to secure plate 20 within housing 12 and to expand gasket 28 to form a seal as previously described. Solid supports are then placed into wells 22 so that they rest upon frits 24. Pressure valve 44 is then opened to allow a positive pressure to build within space 31. Various reagents are then introduced into wells 22 having the solid supports, preferably employing a multichannel pipette or other type of automated filling equipment. In this manner, wells 22 may rapidly be filled with the desired reagents using standard equipment. Because of the positive pressure within space 31, the reagents are prevented from draining through the holes in the bottom end of wells 22. Moreover, the inert gas bubbles through wells 22 to help mix the solid supports with the reagents. The pressure within space 31 may be regulated to maintain the desired positive pressure within space 31. Preferably, a positive pressure that is in the range from about 0.05 psi to about 10 psi, and more preferably from about 0.05 psi to about 1 psi, will be produced within space 31 during the synthesis process. While the reagents are within wells 22, lid 46 is placed over top half 14 to provide a generally inert atmosphere above wells 22 during synthesis. Lid 46 is configured to loosely sit on top half 14 so that gasses can exit or enter into enclosure 18 through the interface between lid 46 and top half 14 when a vacuum or positive pressure is supplied.

After an appropriate amount of time, the reagents are drained from wells 22 by closing pressure valve 42 and opening vacuum valve 44. This creates a negative pressure within space 31 to assist in draining the reagent from wells 22. Preferably, a pump having a capacity sufficient to draw at least about 40 liters per minute through enclosure 18 will be employed. Such a capacity will draw sufficient air through enclosure 18 to assist in draining the liquids. The drained reagents are funneled into opening 34 where they may be collected into a waste bottle. A washing procedure may then take place by pipetting a washing solution into each of the wells while positive pressure is supplied to space 31. After washing, the solvents are drained by closing pressure valve 42 and opening vacuum valve 44. Several washings may occur as needed.

Following synthesis, halves 14 and 16 are separated and plate 20 is removed from synthesizer 10. Plate 20 is then placed on top of receiving plate 52, and the combined plates are placed within cleavage device 50. Halves 14' and 16' are then secured together so that cleavage may occur. The cleavage process begins by pipetting a cleavage solution, such as trifluorocidic acid, into each of wells 22. At the same time, pressure valve 42' is opened to provide positive pressure within space 31' so that the cleavage solution remains within wells 22. After a desired amount of time, the cleavage solution is drained from wells 22 and into wells 54 of receiving plate 52. This is best accomplished by closing pressure valve 42' and opening vacuum valve 44'. The negative pressure within space 31' helps drain the cleavage solution from wells 22 where it falls with the assistance of gravity into wells 54. In this manner, samples are placed within wells 54 in an efficient manner.

Analysis of the samples within wells 54 is accomplished by removing receiving plate 52 from cleavage device 50 and placing it into commercially available analysis equipment which is configured to be compatible with standard sized microtiter plates.

A particular advantage of using both chemical synthesizer 10 and cleavage device 50 is that following synthesis, plate 20 may be removed from synthesizer 10 and placed into cleavage device 50. In this manner, synthesizer 10 is available to receive another plate so that additional compounds may be synthesized. In this manner, a continuous process of synthesizing compounds, cleaving the synthesized compounds and preparing samples for analysis may occur.

The invention has now been described in detail. However, it will be appreciated that certain changes and modifications may be made. Therefore, the scope and content of this invention are not limited by the foregoing description. Rather, the scope and content are to be defined by the following claims.

What is claimed is:

1. A system for processing articles, the system comprising:
   a synthesizing device comprising a first housing defining a first enclosure;
   a cleaving device comprising a second housing defining a second enclosure;
   a first plate having a plurality of wells, with each well having a bottom end, wherein at least some of the wells have a hole in the bottom end; and
   a second plate having a plurality of wells, wherein the first plate may be placed on top of the second plate to allow fluids from the top plate to drain into the wells of the second plate;
   wherein the synthesizing device enclosure is configured to receive the first plate, and wherein the cleaving device enclosure is configured to receive both the first plate and the second plate when combined, such that the first plate may be removed from the synthesizing device, stacked on top of the second plate and placed into the cleaving device; and
   wherein at least one opening is defined between the first plate and the second plate such that the holes in the wells of the first plate are in fluidic communication with the enclosure of the cleavage device when the first and the second plates are placed into the enclosure of the cleavage device such that application of a vacuum within the enclosure of the cleavage device is adapted to draw liquids from the wells in the first plate and into the wells of the second plate.

2. A system as in claim 1, wherein the synthesizing device and the cleaving device each include a pressure source in fluid communication with the enclosures, wherein fluids may be maintained within the wells of the first plate by application of pressure from the pressure sources.

3. A system as in claim 2, wherein the synthesizing device and the cleaving device each include a vacuum source in fluid communication with the enclosures, wherein fluids may be transferred from the wells of the first plate by application of negative pressure from the vacuum sources.

4. A system as in claim 3, wherein the synthesizing device and the cleaving device each include a seal between the first plate and the housing, wherein the housings and the seals define manifolds, wherein the pressure sources and the vacuum sources are operably connected to the manifolds so that fluids may be maintained within or transferred from the wells by applying positive or negative pressure to the manifolds.

5. A system as in claim 4, wherein the housings each include at least one opening therein, and wherein the pressure sources and the vacuum sources are operably connected to the openings.

6. A system as in claim 4, wherein each housing comprises a top half and a bottom half which mate together to form the enclosures.

7. A system as in claim 6, wherein the seals each comprise a resilient gasket which at least partially sits between the top halves and the bottom halves, wherein the housings compress the seals causing the seals to expand against the plates.

8. A system for processing articles, the system comprising:
- a synthesizing device comprising a housing defining an enclosure;
- a cleaving device comprising a housing defining an enclosure and a vacuum source in fluid communication with the cleavage enclosure;
- a first plate having a plurality of wells, with each well having a bottom end, wherein at least some of the wells have a hole in the bottom end; and
- a second plate having a plurality of wells, wherein the first plate may be placed on top of the second plate to allow fluids from the top plate to drain into the wells of the second plate;
- wherein the synthesizing device enclosure is configured to receive the first plate, and wherein the cleaving device enclosure is configured to receive both the first plate and the second plate when combined, such that the first plate may be removed from the synthesizing device, stacked on top of the second plate and placed into the cleaving device; and
- wherein at least one opening is defined between the first plate and the second plate such that the holes in the wells of the first plate are in fluidic communication with the enclosure of the cleavage device when the first and the second plates are placed into the enclosure of the cleavage device such that application of the vacuum source is adapted to create a vacuum in the enclosure of the cleavage device and thereby draw liquids from the wells in the first plate and into the wells of the second plate.

9. A system as in claim 8, wherein the synthesizing device and the cleaving device each include a pressure source in fluid communication with the enclosures, wherein fluids may be maintained within the wells of the first plate by application of pressure from the pressure sources.

10. A system as in claim 9, wherein the synthesizing device also includes a vacuum source in fluid communication with the synthesizing enclosure, wherein fluids may be transferred from the wells of the first plate by application of negative pressure from the vacuum source of the synthesizing device.

11. A system as in claim 10, wherein the synthesizing device and the cleaving device each include a seal between the first plate and the housing, wherein the housings and the seals define manifolds, wherein the pressure sources and the vacuum sources are operably connected to the manifolds so that fluids may be maintained within or transferred from the wells by applying positive or negative pressure to the manifolds.

12. A system as in claim 11, wherein the housings each include at least one opening therein, and wherein the pressure sources and the vacuum sources are operably connected to openings.

13. A system as in claim 12, wherein each housing comprises a top half and a bottom half which mate together to form the enclosures.

14. A system as in claim 13, wherein the seals each comprise a resilient gasket which at least partially sits between the top halves and the bottom halves, wherein the housings compress the seals causing the seals to expand against the plates.

* * * * *